US012558922B2

(12) United States Patent　　　　(10) Patent No.:　US 12,558,922 B2
Kikuchi et al.　　　　　　　　　　(45) Date of Patent:　Feb. 24, 2026

(54) TIRE

(71) Applicant: Sumitomo Rubber Industries, Ltd.,
Hyogo (JP)

(72) Inventors: Hiroshi Kikuchi, Kobe (JP); Takuya Osawa, Kobe (JP); Jo Shimizu, Kobe (JP)

(73) Assignee: Sumitomo Rubber Industries, Ltd.,
Hyogo (JP)

( * ) Notice: Subject to any disclaimer, the term of this patent is extended or adjusted under 35 U.S.C. 154(b) by 340 days.

(21) Appl. No.: 18/069,093

(22) Filed: Dec. 20, 2022

(65) Prior Publication Data

US 2023/0202237 A1　　Jun. 29, 2023

(30) Foreign Application Priority Data

Dec. 27, 2021　(JP) ................................. 2021-211954

(51) Int. Cl.
　*B60C 9/28*　　　(2006.01)
　*B60C 11/00*　　(2006.01)
　*B60C 11/03*　　(2006.01)

(52) U.S. Cl.
CPC .............. *B60C 9/28* (2013.01); *B60C 11/005* (2013.01); *B60C 2011/0025* (2013.01);
(Continued)

(58) Field of Classification Search
CPC .. B60C 11/005; B60C 9/28; B60C 2011/0348
See application file for complete search history.

(56) References Cited

U.S. PATENT DOCUMENTS 4,444,236 A * 4/1984 Kan ...................... B60C 1/0016
　　　　　　　　　　　　　　　　　152/549
5,225,011 A * 7/1993 Takino ................. C08K 5/5419
　　　　　　　　　　　　　　　　　152/209.5
(Continued)

FOREIGN PATENT DOCUMENTS

JP　　　07266805 A * 10/1995
JP　　2002211209 A * 7/2002 ........... B60C 11/005
(Continued)

OTHER PUBLICATIONS

The extended European search report issued by the European Patent Office on May 8, 2023, which corresponds to European Patent Application No. 22210074.5-1012 and is related to U.S. Appl. No. 18/069,093.

*Primary Examiner* — Robert C Dye
(74) *Attorney, Agent, or Firm* — Studebaker Brackett PLLC

(57)　　　　　　　　ABSTRACT

A tire 2 includes a tread 4 and a belt 14 including inner and outer layers 38 and 40. Each end of the outer layer 40 is located axially inward of an end of the inner layer 38. A circumferential narrow groove 48 is formed on each shoulder land portion 46s so as to continuously extend in a circumferential direction. A groove width of the circumferential narrow groove 48 is smaller than that of a shoulder circumferential groove 44s. The circumferential narrow groove 48 is located between the shoulder circumferential groove 44s and the end of the outer layer 40 in an axial direction. A ratio of a distance in the axial direction from the shoulder circumferential groove 44s to the circumferential narrow groove 48 to a distance in the axial direction from the shoulder circumferential groove 44s to the end of the outer layer 40 is 15% to 55%.

16 Claims, 4 Drawing Sheets

(52) U.S. Cl.
CPC ................. *B60C 2011/0348* (2013.01); *B60C 2011/0353* (2013.01); *B60C 2011/0355* (2013.01)

(56) References Cited

U.S. PATENT DOCUMENTS

| | | | | |
|---|---|---|---|---|
| 2005/0284553 A1* | 12/2005 | Ikeda ..................... | B29D 30/60 |
| | | | 152/209.5 |
| 2011/0024012 A1* | 2/2011 | Iwai ................... | B60C 11/0306 |
| | | | 152/209.27 |
| 2011/0056601 A1* | 3/2011 | Ebiko ................ | B60C 15/0018 |
| | | | 152/209.16 |
| 2012/0085471 A1 | 4/2012 | Horiguchi | |
| 2014/0209225 A1* | 7/2014 | Kuroda .............. | B60C 11/1236 |
| | | | 152/209.18 |
| 2014/0373989 A1* | 12/2014 | Hirayama ................ | C08L 9/00 |
| | | | 152/209.1 |
| 2015/0047762 A1 | 2/2015 | Shimizu et al. | |
| 2020/0331299 A1 | 10/2020 | Buresh et al. | |

FOREIGN PATENT DOCUMENTS

| JP | 2005-047398 A | 2/2005 |
|---|---|---|
| JP | 2015-006871 A | 1/2015 |
| JP | 2021-075220 A | 5/2021 |
| JP | 2021-120242 A | 8/2021 |

* cited by examiner

FIG. 4

TIRE

CROSS REFERENCE TO RELATED APPLICATION(S)

The present application claims priority to Japanese patent application JP 2021-211954, filed on Dec. 27, 2021, the entire contents of which is incorporated herein by reference in its entirety.

BACKGROUND

Technical Field

The present disclosure relates to a tire. Specifically, the present disclosure relates to a tire that is mounted to a passenger car.

Background Art

From consideration for the environment, reduction of rolling resistance is required for tires that are mounted to vehicles. Therefore, studies have been made by, for example, decreasing the number of components included in a tire, decreasing the thicknesses of the components, using low heat generation materials as the materials forming the components, etc. (for example, Japanese Laid-Open Patent Publication No. 2021-120242).

A tread includes a cap portion and a base portion. The cap portion has a tread surface which comes into contact with a road surface. Normally, for the cap portion, importance is placed on grip performance rather than on low heat generation properties.

For the base portion, a crosslinked rubber that has low heat generation properties is used. If a crosslinked rubber for which low heat generation properties are taken into consideration is used for the cap portion, the rolling resistance of a tire is reduced. However, grip performance on a wet road surface (hereinafter, referred to as WET performance) is decreased.

For tires, low rolling resistance and good WET performance are required. Establishment of a technology capable of achieving reduction of rolling resistance without decreasing WET performance is required.

By forming a narrow groove on each shoulder land portion, strain generated in the shoulder land portion is reduced. In this case, it is expected that rolling resistance can be reduced without changing WET performance. However, depending on the position of the groove, damage such as belt edge loosening (BEL) may occur. For this, it is difficult to say that reduction of rolling resistance is achieved.

The present disclosure has been made in view of such circumstances. An object of the present disclosure is to provide a tire that can achieve reduction of rolling resistance without decreasing WET performance.

SUMMARY

A tire according to an aspect of the present disclosure includes: a tread configured to come into contact with a road surface; and a belt located radially inward of the tread. A plurality of circumferential grooves are formed on the tread so as to be aligned in an axial direction such that at least three land portions are formed in the tread. Among the plurality of circumferential grooves, a circumferential groove located on each outermost side in the axial direction is a shoulder circumferential groove, and among said at least three land portions, a land portion located on each outermost side in the axial direction is a shoulder land portion. The belt includes an inner layer and an outer layer located radially outward of the inner layer. Each end of the outer layer is located axially inward of an end of the inner layer. A circumferential narrow groove is formed on the shoulder land portion so as to continuously extend in a circumferential direction. A groove width of the circumferential narrow groove is smaller than a groove width of the shoulder circumferential groove.

The circumferential narrow groove is located between the shoulder circumferential groove and the end of the outer layer in the axial direction. A ratio of a distance in the axial direction from the shoulder circumferential groove to the circumferential narrow groove to a distance in the axial direction from the shoulder circumferential groove to the end of the outer layer is not less than 15% and not greater than 55%.

BRIEF DESCRIPTION OF THE DRAWINGS

FIG. 4 is a cross-sectional view showing a part of a tread portion.

DETAILED DESCRIPTION

Figure 1:
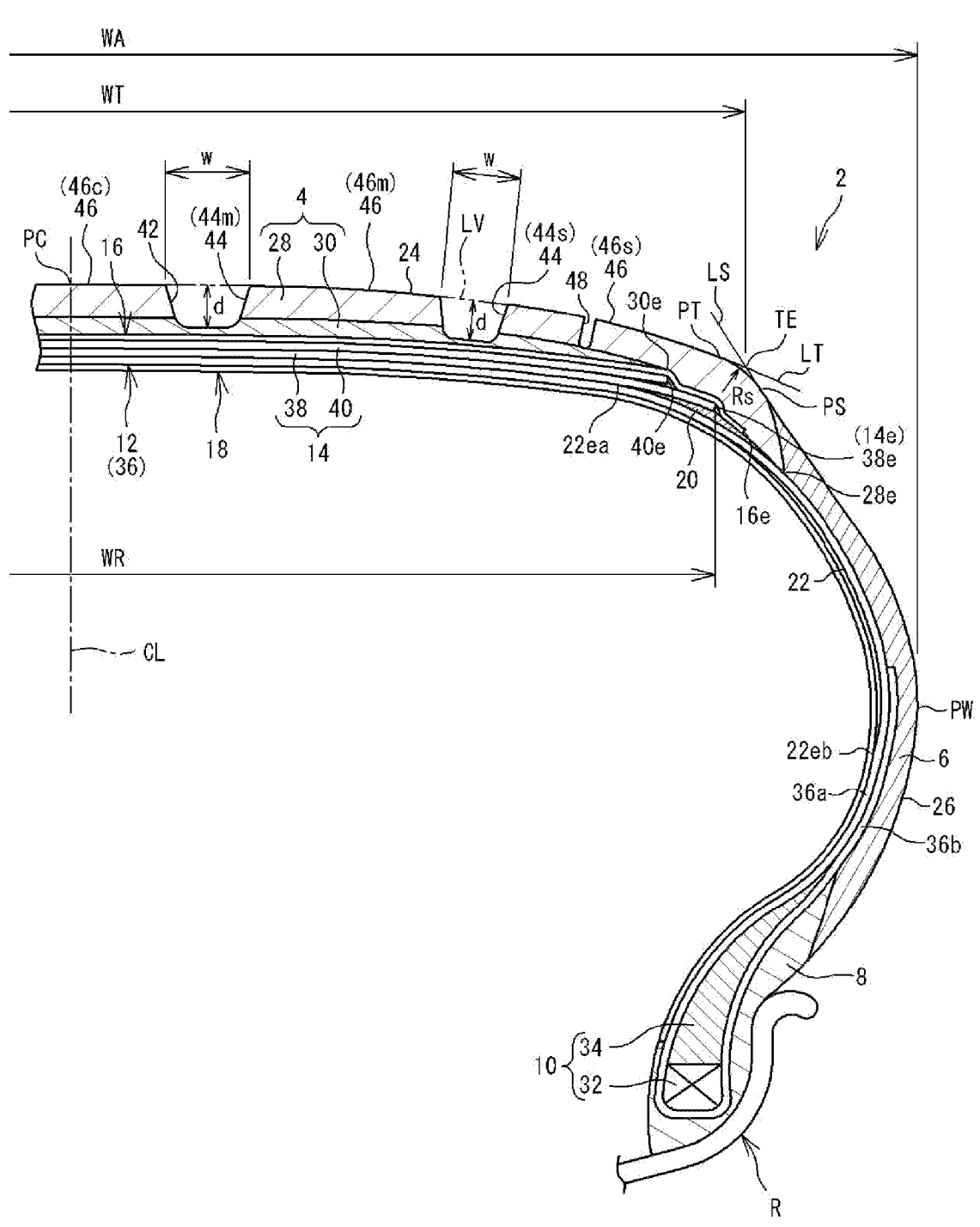
FIG. 1 is a cross-sectional view showing a part of a tire according to an embodiment of the present disclosure.

Hereinafter, the present disclosure will be described in detail based on preferred embodiments with appropriate reference to the drawings.

In the present disclosure, a state where a tire is fitted on a normal rim, the internal pressure of the tire is adjusted to a normal internal pressure, and no load is applied to the tire is referred to as a normal state.

In the present disclosure, unless otherwise specified, the dimensions and angles of each component of the tire are measured in the normal state.

The dimensions and angles of each component in a meridian cross-section of the tire, which cannot be measured in a state where the tire is fitted on the normal rim, are measured in a cross-section (hereinafter, referred to as a reference cut plane) of the tire obtained by cutting the tire along a plane including a rotation axis, with the distance between right and left beads being made equal to the distance between the beads in the tire that is fitted on the normal rim.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

The normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, a loss tangent (tan δ), at a temperature of 30° C., of a component formed from a crosslinked rubber, of the components included in the tire, is measured using a viscoelasticity spectrometer ("VES" manufactured by Iwamoto Seisakusho) under the following conditions according to the standards of JIS K6394.

Initial strain=10%
Dynamic strain=2%
Frequency=10 Hz
Deformation mode=tension

In this measurement, a test piece is sampled from the tire. When a test piece cannot be sampled from the tire, a test piece is sampled from a sheet-shaped crosslinked rubber (hereinafter, also referred to as a rubber sheet) obtained by pressurizing and heating a rubber composition, which is used for forming the component to be measured, at a temperature of 170° C. for 12 minutes.

In the present disclosure, a tread portion of the tire is a portion of the tire that comes into contact with a road surface. A bead portion is a portion of the tire that is fitted to a rim. A side portion is a portion of the tire that extends between the tread portion and the bead portion. The tire includes a tread portion, a pair of bead portions, and a pair of side portions as portions thereof.

FIG. 1 shows a part of a tire 2 according to an embodiment of the present disclosure. The tire 2 is a pneumatic tire for a passenger car.

FIG. 1 shows a part of a cross-section (hereinafter, referred to as a meridian cross-section) of the tire 2 taken along a plane including the rotation axis of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2. An alternate long and short dash line CL represents the equator plane of the tire 2.

The tire 2 is fitted on a rim R. The rim R is a normal rim. The interior of the tire 2 is filled with air to adjust the internal pressure of the tire 2. The tire 2 fitted on the rim R is also referred to as a tire-rim assembly. The tire-rim assembly includes the rim R and the tire 2 fitted on the rim R.

In FIG. 1, a position indicated by reference character PC is the point of intersection of the outer surface of the tire 2 and the equator plane CL. The point of intersection PC is also referred to as the equator of the tire 2. In the case where a groove is located on the equator plane CL, the equator PC is specified on the basis of a virtual outer surface (virtual tread surface described later) obtained on the assumption that no groove is provided thereon. The equator PC is also the radially outer end of the tire 2.

In FIG. 1, a position indicated by reference character PW is an axially outer end of the tire 2. In the case where decorations such as patterns and letters are present on the outer surface of the tire 2, the outer end PW is specified on the basis of a virtual outer surface obtained on the assumption that the decorations are not present.

In FIG. 1, a length indicated by reference character WA is the cross-sectional width (see JATMA or the like) of the tire 2. The cross-sectional width WA is the distance in the axial direction from a first outer end PW to a second outer end PW. The cross-sectional width WA is the maximum width of the tire 2, and each outer end PW is a position (hereinafter, referred to as a maximum width position) at which the tire 2 has the maximum width WA. The cross-sectional width WA is specified in the tire 2 in the normal state.

The tire 2 includes a tread 4, a pair of sidewalls 6, a pair of clinches 8, a pair of beads 10, a carcass 12, a belt 14, a band 16, an inner liner 18, a pair of cushions 20, and a pair of insulations 22 as components thereof.

The tread 4 comes into contact with a road surface at a tread surface 24 thereof. The tread 4 has the tread surface 24 which comes into contact with a road surface.

In the outer surface of the tire 2, a side surface 26 is connected to the tread surface 24. The outer surface of the tire 2 includes the tread surface 24 and a pair of side surfaces 26.

In the meridian cross-section, the contour of the tread surface 24 includes a plurality of arcs aligned in the axial direction. Among the plurality of arcs, an arc located on the outer side in the axial direction is a shoulder arc and has a smallest radius Rs. The contour line of the side surface 26 is connected to the shoulder arc.

A position indicated by reference character PT is the boundary between the shoulder arc and an arc located adjacent to the shoulder arc. A straight line LT is a tangent line that is tangent to the shoulder arc at the boundary PT.

A position indicated by reference character PS is the boundary between the shoulder arc and the contour line of the side surface 26. A straight line LS is a tangent line that is tangent to the shoulder arc at the boundary PS.

Reference character TE is the point of intersection of the tangent line LT and the tangent line LS. In the present disclosure, the point of intersection TE is a reference end of the tread 4. A length indicated by reference character WT is the distance in the axial direction from a first reference end TE to a second reference end TE. In the present disclosure, the distance WT in the axial direction is the width of the tread 4.

In the tire 2, the ratio (WT/WA) of the width WT of the tread 4 to the cross-sectional width WA of the tire 2 is not less than 75% and not greater than 90%.

The tread 4 includes a cap portion 28 and a base portion 30.

The cap portion 28 includes the tread surface 24. The cap portion 28 comes into contact with a road surface. The cap portion 28 is formed from a crosslinked rubber for which wear resistance and grip performance are taken into consideration.

The base portion 30 is located radially inward of the cap portion 28. Each end 30e of the base portion 30 is located axially inward of an end 28e of the cap portion 28. The entirety of the base portion 30 is covered with the cap portion 28. The base portion 30 does not come into contact with a road surface unless the tread 4 is worn away and the base portion 30 becomes exposed. For the base portion 30, unlike the cap portion 28, wear resistance and grip performance are not taken into consideration.

The base portion 30 is formed from a crosslinked rubber that has low heat generation properties. A loss tangent of the base portion 30 at 30° C. (hereinafter, a loss tangent LTb of the base portion 30) is lower than a loss tangent of the cap portion 28 at 30° C. (hereinafter, a loss tangent LTc of the cap portion 28). Specifically, the ratio (LTb/LTc) of the loss tangent LTb of the base portion 30 to the loss tangent LTc of the cap portion 28 is preferably not less than 0.15 and preferably not greater than 0.55.

In the tire 2, the loss tangent LTb of the base portion 30 is preferably not greater than 0.11. The base portion 30 contributes to reduction of rolling resistance. In this respect, the loss tangent LTb is preferably lower, so that a preferable lower limit thereof is not set.

In the tire 2, the base portion 30 is formed such that, in the meridian cross-section of the tire 2, the base portion 30 has a uniform thickness at a center portion thereof and gradually becomes thinner at an axially outer portion thereof with decreasing distance to an end thereof.

For example, the ratio of the thickness of the base portion 30 to the thickness of the tread 4, measured along the equator plane CL, is set in the range of not less than 10% and not greater than 80%. When importance is placed on rolling resistance, the tread 4 is formed such that the base portion 30 is thick. When importance is placed on grip performance, the tread 4 is formed such that the base portion 30 is thin.

Each sidewall 6 is connected to an end of the tread 4. The sidewall 6 is located radially inward of the tread 4. The sidewall 6 is formed from a crosslinked rubber for which cut resistance is taken into consideration.

Each clinch 8 is located radially inward of the sidewall 6. The clinch 8 comes into contact with the rim R. The clinch 8 is formed from a crosslinked rubber for which wear resistance is taken into consideration.

Each bead 10 is located axially inward of the clinch 8. The bead 10 is located radially inward of the sidewall 6.

The bead 10 includes a core 32 and an apex 34. The core 32 extends in the circumferential direction. The core 32 includes a steel wire which is not shown. The apex 34 is located radially outward of the core 32. The apex 34 is tapered radially outward. The apex 34 is formed from a crosslinked rubber that has high stiffness.

The carcass 12 is located inward of the tread 4, the pair of sidewalls 6, and the pair of clinches 8. The carcass 12 extends on and between a first bead 10 and a second bead 10 out of the pair of beads 10. The carcass 12 includes at least one carcass ply 36.

The carcass 12 of the tire 2 is composed of one carcass ply 36 in consideration of reduction of rolling resistance. The carcass ply 36 includes a large number of carcass cords aligned with each other, which are not shown. These carcass cords intersect the equator plane CL. The carcass 12 of the tire 2 has a radial structure. In the tire 2, a cord formed from an organic fiber is used as each carcass cord. Examples of the organic fiber include nylon fibers, rayon fibers, polyester fibers, and aramid fibers.

The carcass ply 36 includes a ply body 36a and a pair of first turned-up portions 36b. The ply body 36a extends between the first bead 10 and the second bead 10. Each turned-up portion 36b is connected to the ply body 36a and turned up around the bead 10 from the inner side toward the outer side in the axial direction.

The belt 14 is located radially inward of the tread 4. The belt 14 is stacked on the carcass 12.

In FIG. 1, a length indicated by reference character WR is the width in the axial direction of the belt 14. The width WR in the axial direction is the distance in the axial direction from a first end of the belt 14 to a second end of the belt 14. The above-described equator plane CL intersects the belt 14 at the center of the width WR in the axial direction of the belt 14.

In the tire 2, the width WR in the axial direction of the belt 14 is not less than 85% and not greater than 100% of the width WT of the tread 4.

The belt 14 includes an inner layer 38 and an outer layer 40. The inner layer 38 is located radially outward of the ply body 36a, and stacked on the ply body 36a. The outer layer 40 is located radially outward of the inner layer 38, and stacked on the inner layer 38.

In the tire 2, one or more layers may be provided between the inner layer 38 and the outer layer 40. From the viewpoint of weight reduction, the belt 14 is preferably composed of two layers including the inner layer 38 and the outer layer 40.

As shown in FIG. 1, each end 40e of the outer layer 40 is located axially inward of an end 38e of the inner layer 38. The outer layer 40 is narrower than the inner layer 38. The length from the end 40e of the outer layer 40 to the end 38e of the inner layer 38 is not less than 3 mm and not greater than 10 mm. The above-described width WR in the axial direction of the belt 14 is represented as the width in the axial direction of the wide inner layer 38.

Each of the inner layer 38 and the outer layer 40 includes a large number of belt cords aligned with each other, which are not shown. These belt cords are covered with a topping rubber. Each belt cord is inclined relative to the equator plane CL. An angle of the belt cord with respect to the equator plane CL (inclination angle of the belt cord) is not less than 10 degrees and not greater than 35 degrees. The direction in which the belt cords (inner belt cords) included in the inner layer 38 are inclined is opposite to the direction in which the belt cords (outer belt cords) included in the outer layer 40 are inclined. The inclination angle of the inner belt cords and the inclination angle of the outer belt cords are equal to each other. The material of each belt cord is steel.

The band 16 is located between the tread 4 and the belt 14 in the radial direction. The band 16 is stacked on the belt 14.

The band 16 includes a helically wound band cord which is not shown. The band cord is covered with a topping rubber. The band cord extends substantially in the circumferential direction. Specifically, an angle of the band cord with respect to the circumferential direction is not greater than 5°. The band 16 has a jointless structure. A cord formed from an organic fiber is used as the band cord. Examples of the organic fiber include nylon fibers, rayon fibers, polyester fibers, and aramid fibers.

In the axial direction, an end 16e of the band 16 is located outward of an end 14e of the belt 14. The length from the end 14e of the belt 14 to the end 16e of the band 16 is not less than 3 mm and not greater than 7 mm. The band 16 holds the end 14e of the belt 14.

The band 16 of the tire 2 is a full band. The full band has ends opposed to each other across the equator plane CL. The band 16 covers the entirety of the belt 14. The band 16 holds the entirety of the belt 14. In the tire 2, a shape change of a ground-contact surface is suppressed.

The band 16 may be composed of a pair of edge bands that are disposed so as to be spaced apart from each other with the equator plane CL therebetween and are each formed so as to cover a portion at the end 14e of the belt 14. In this case, the band 16 contributes to reduction of the weight of the tire 2. In order to increase the stiffness of the tread 4, the band 16 may include a full band and a pair of edge bands.

The inner liner 18 is located inward of the carcass 12. The inner liner 18 forms an inner surface of the tire 2. The inner liner 18 is formed from a crosslinked rubber that has an excellent air blocking property. The inner liner 18 maintains the internal pressure of the tire 2.

The respective cushions 20 are located so as to be spaced apart from each other in the axial direction. Each cushion 20 is located between the ends of the belt 14 and the band 16 and the carcass 12. The cushion 20 is formed from a crosslinked rubber that has low stiffness. In the tire 2, the cushions 20 are not essential components. Depending on the specifications of the tire 2, the cushions 20 may not necessarily be provided.

Each insulation 22 is located between the carcass 12 and the inner liner 18. A first end 22ea of the insulation 22 is located axially inward of the end 14*e* of the belt 14. A second end 22*eb* of the insulation 22 is located radially inward of the maximum width position PW. The second end 22*eb* of the insulation 22 is located radially outward of the bead 10. The insulation 22 is formed from a crosslinked rubber for which adhesiveness is taken into consideration.

In the tire 2, at a portion where each insulation 22 is provided, the inner liner 18 is joined to the carcass 12 via the insulation 22. The inner liner 18 is joined directly to the carcass 12 at a portion between the first end 22*ea* of a first insulation 22 and the first end 22*ea* of a second insulation 22 which is not shown, and a portion where no insulation 22 is provided, such as an inner portion from the second end 22*eb* of each insulation 22. The entirety of the inner liner 18 may be joined to the carcass 12 by the insulations 22. From the viewpoint of reduction of rolling resistance, as shown in FIG. 1, preferably, a pair of insulations 22 disposed so as to be spaced apart from each other in the axial direction are provided, and each insulation 22 is disposed in a zone between the end 14*e* of the belt 14 and the maximum width position PW.

Grooves 42 are formed on the tread 4 of the tire 2. Accordingly, a tread pattern is formed.

The grooves 42 include a circumferential groove 44 continuously extending in the circumferential direction. In the tire 2, a plurality of circumferential grooves 44 are formed on the tread 4 so as to be aligned in the axial direction. In the tire 2 shown in FIG. 1, four circumferential grooves 44 are formed on the tread 4.

Among the four circumferential grooves 44, a circumferential groove 44 located on each outermost side in the axial direction is a shoulder circumferential groove 44*s*. A circumferential groove 44 located axially inward of the shoulder circumferential groove 44*s* is a middle circumferential groove 44*m*.

On the tread 4 of the tire 2, a pair of the middle circumferential grooves 44*m* and a pair of the shoulder circumferential grooves 44*s* are formed.

In FIG. 1, an alternate long and two short dashes line LV represents a virtual tread surface obtained on the assumption that the grooves 42 are not provided on the tread 4. A length indicated by each reference character d is the distance from the virtual tread surface LV to the groove bottom of the circumferential groove 44. The distance d is the groove depth of the circumferential groove 44. A length indicated by each reference character w is the groove width of the circumferential groove 44. The groove width w is represented as the opening width of the circumferential groove 44 in the tread surface 24.

The groove depth d of the circumferential groove 44 is preferably not less than 70% and not greater than 95% of the thickness of the tread 4. The thickness of the tread 4 for specifying the groove depth d is represented as the distance, from the virtual tread surface LV to the inner surface of the tread 4, measured along a line segment indicating the groove depth d.

The groove width w of the circumferential groove 44 is preferably not less than 3% and not greater than 15% of the width WT of the tread 4.

As described above, in the tire 2, the plurality of circumferential grooves 44 are formed on the tread 4 so as to be aligned in the axial direction. Accordingly, at least three land portions 46 are formed in the tread 4. As shown in FIG. 1, five land portions 46 are formed in the tread 4 of the tire 2. Land surfaces of these land portions 46 are included in the tread surface 24.

Among the five land portions 46, a land portion 46 located on each outermost side in the axial direction is a shoulder land portion 46*s*. A land portion 46 located axially inward of the shoulder land portion 46*s* is a middle land portion 46*m*. A land portion 46 located axially inward of the middle land portion 46*m*, that is, a land portion 46 located at the center among the five land portions 46 which are aligned in the axial direction, is a center land portion 46*c*. In the tire 2, the center land portion 46*c* includes the equator PC.

In the tread 4 of the tire 2, the center land portion 46*c*, a pair of the middle land portions 46*m*, and a pair of the shoulder land portions 46*s* are formed.

The width in the axial direction of each shoulder land portion 46*s* is represented as the distance in the axial direction from the boundary between the shoulder circumferential groove 44*s* and the land surface of the shoulder land portion 46*s* to the end TE of the tread 4.

In the tire 2, the ratio of the width in the axial direction of each shoulder land portion 46*s* to the width WT of the tread 4 is preferably not less than 15% and not greater than 30%.

The width in the axial direction of the land portion 46 located between two circumferential grooves 44, such as the center land portion 46*c* and the middle land portions 46*m*, is represented as the width in the axial direction of the land surface thereof. This width in the axial direction is determined as appropriate in consideration of the number of circumferential grooves 44 formed on the tread 4, the groove widths w thereof, etc.

At the tread 4 of the tire 2, contact and non-contact with a road surface are repeated. In a non-contact state where the tread 4 is not in contact with a road surface, the land surface of each shoulder land portion 46*s* is located radially inward of the land surface of the center land portion 46*c*. In a contact state where the tread 4 is in contact with a road surface, the tread 4 is pressed against the road surface. Accordingly, the tread 4 becomes deformed. The center land portion 46*c* moves radially inward, the ground-contact surface extends axially outward from the equator PC, and each shoulder land portion 46*s* comes into contact with the road surface. The tread 4 in the ground-contact state becomes deformed such that the tread surface 24 warps in the opposite direction. Therefore, compressive strain is generated in each shoulder land portion 46*s*.

The compressive strain is a factor that increases rolling resistance. Therefore, the present inventors have investigated in detail the behavior of generation of compressive strain, and as a result, the present inventors have found that large compressive strain is generated particularly around the end 40*e* of the outer layer 40 in each shoulder land portion 46*s* and generation of compressive strain is suppressed by forming a circumferential narrow groove having a groove width smaller than the groove width w of the circumferential groove 44 in a specific region of a portion between the shoulder circumferential groove 44*s* and the end 40*e* of the outer layer 40, and thus have completed the present disclosure.

Figure 2:
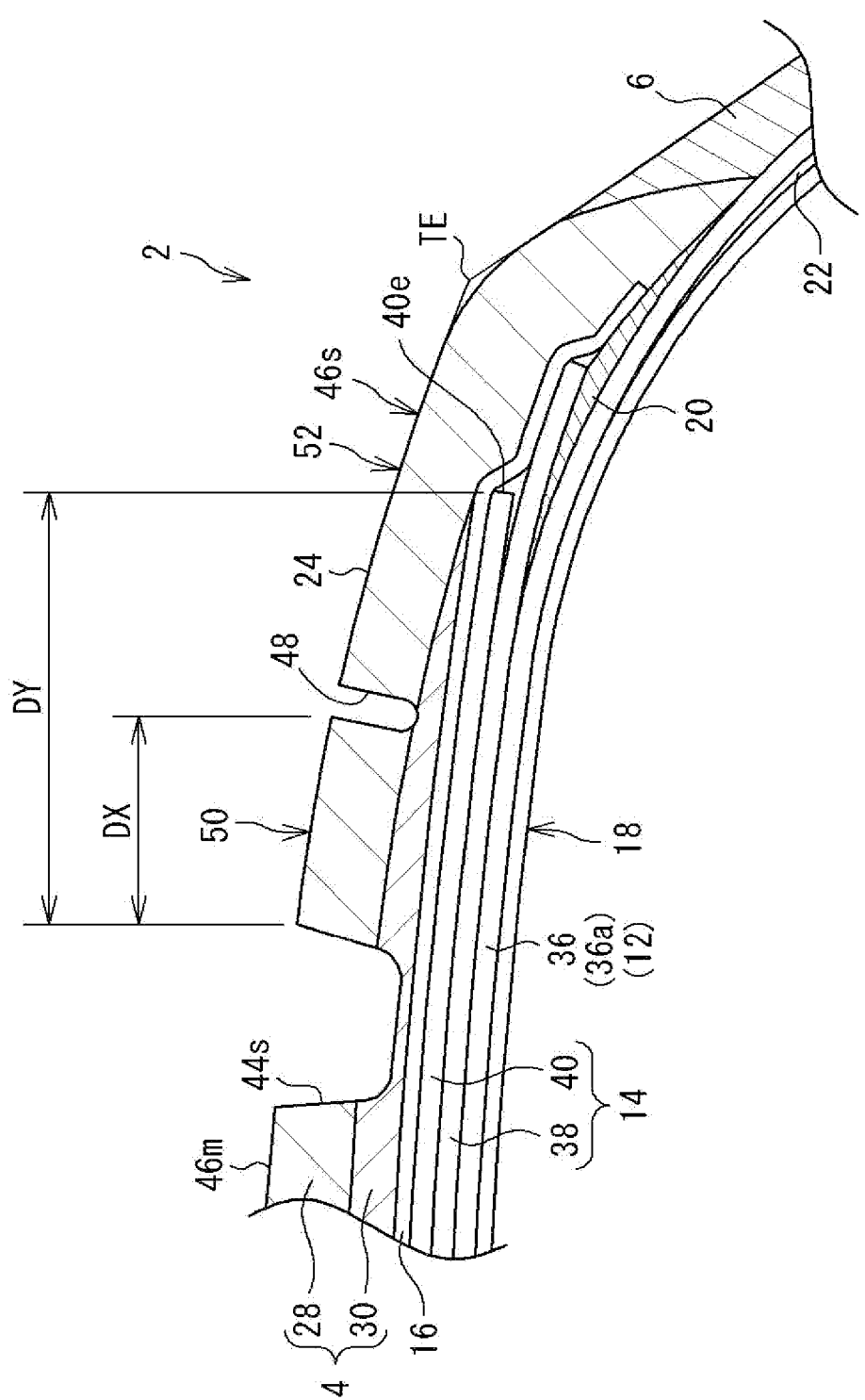
FIG. 2 is a cross-sectional view showing a shoulder land portion.

FIG. 2 shows a part of the tire 2 shown in FIG. 1. FIG. 2 shows a portion at the shoulder land portion 46*s* of a tread portion.

A circumferential narrow groove 48 is formed on each shoulder land portion 46*s* of the tire 2. The circumferential narrow groove 48 forms a part of the grooves 42 which form the tread pattern. The circumferential narrow groove 48 continuously extends in the circumferential direction. The circumferential narrow groove 48 divides the shoulder land portion 46s into an inner land portion 50 and an outer land portion 52.

As shown in FIG. 2, the circumferential narrow groove 48 is located between the shoulder circumferential groove 44s and the end 40e of the outer layer 40 in the axial direction. The groove width of the circumferential narrow groove 48 is smaller than the groove width w of the shoulder circumferential groove 44s. Therefore, the influence of the circumferential narrow groove 48 on the stiffness of the shoulder land portion 46s is small. The shoulder land portion 46s has required stiffness. In the tire 2, reduction of cornering power is suppressed.

In FIG. 2, a length indicated by reference character DY is the distance in the axial direction from the shoulder circumferential groove 44s to the end 40e of the outer layer 40. A length indicated by reference character DX is the distance in the axial direction from the shoulder circumferential groove 44s to the circumferential narrow groove 48. The distance DX in the axial direction is the width in the axial direction of the land surface of the inner land portion 50.

As described above, in the tire 2, the circumferential narrow groove 48 is located between the shoulder circumferential groove 44s and the end 40e of the outer layer 40 in the axial direction. In particular, in the tire 2, the ratio (DX/DY) of the distance DX in the axial direction from the shoulder circumferential groove 44s to the circumferential narrow groove 48 to the distance DY in the axial direction from the shoulder circumferential groove 44s to the end 40e of the outer layer 40 is not less than 15% and not greater than 55%.

Since the ratio (DX/DY) is not less than 15%, interference between the circumferential narrow groove 48 and the shoulder circumferential groove 44s is suppressed. Since the inner land portion 50 has required stiffness, the circumferential narrow groove 48 contributes to suppressing generation of compressive strain. Since generation of compressive strain is suppressed, reduction of rolling resistance can be achieved in the tire 2. From this viewpoint, the ratio (DX/DY) is preferably not less than 25%, more preferably not less than 35%, and further preferably not less than 45%.

Since the ratio (DX/DY) is not greater than 55%, the circumferential narrow groove 48 is located at an appropriate distance from the end 40e of the outer layer 40. Interference between the circumferential narrow groove 48 and the end 40e of the outer layer 40 is suppressed. Occurrence of damage such as loosening in a portion at the end 40e of the outer layer 40 is suppressed. In this case as well, the circumferential narrow groove 48 can stably and sufficiently exhibit a function of suppressing generation of compressive strain. Since generation of compressive strain is suppressed, reduction of rolling resistance can be achieved in the tire 2. From this viewpoint, the ratio (DX/DY) is more preferably not greater than 50%.

In the tire 2, in each shoulder land portion 46s, the circumferential narrow groove 48 having a groove width smaller than the groove width of the shoulder circumferential groove 44s is formed in a specific region of the portion between the shoulder circumferential groove 44s and the end 40e of the outer layer 40. Accordingly, generation of compressive strain is suppressed, so that reduction of rolling resistance can be achieved.

In the tire 2, for reducing rolling resistance, it is not necessary to take low heat generation properties into consideration for the crosslinked rubber forming the cap portion 28. In the tire 2, the cap portion 28 can be formed from a crosslinked rubber for which importance is placed on grip performance on a wet road surface (hereinafter, referred to as WET performance).

The tire 2 can achieve reduction of rolling resistance without decreasing WET performance.

Figure 3:
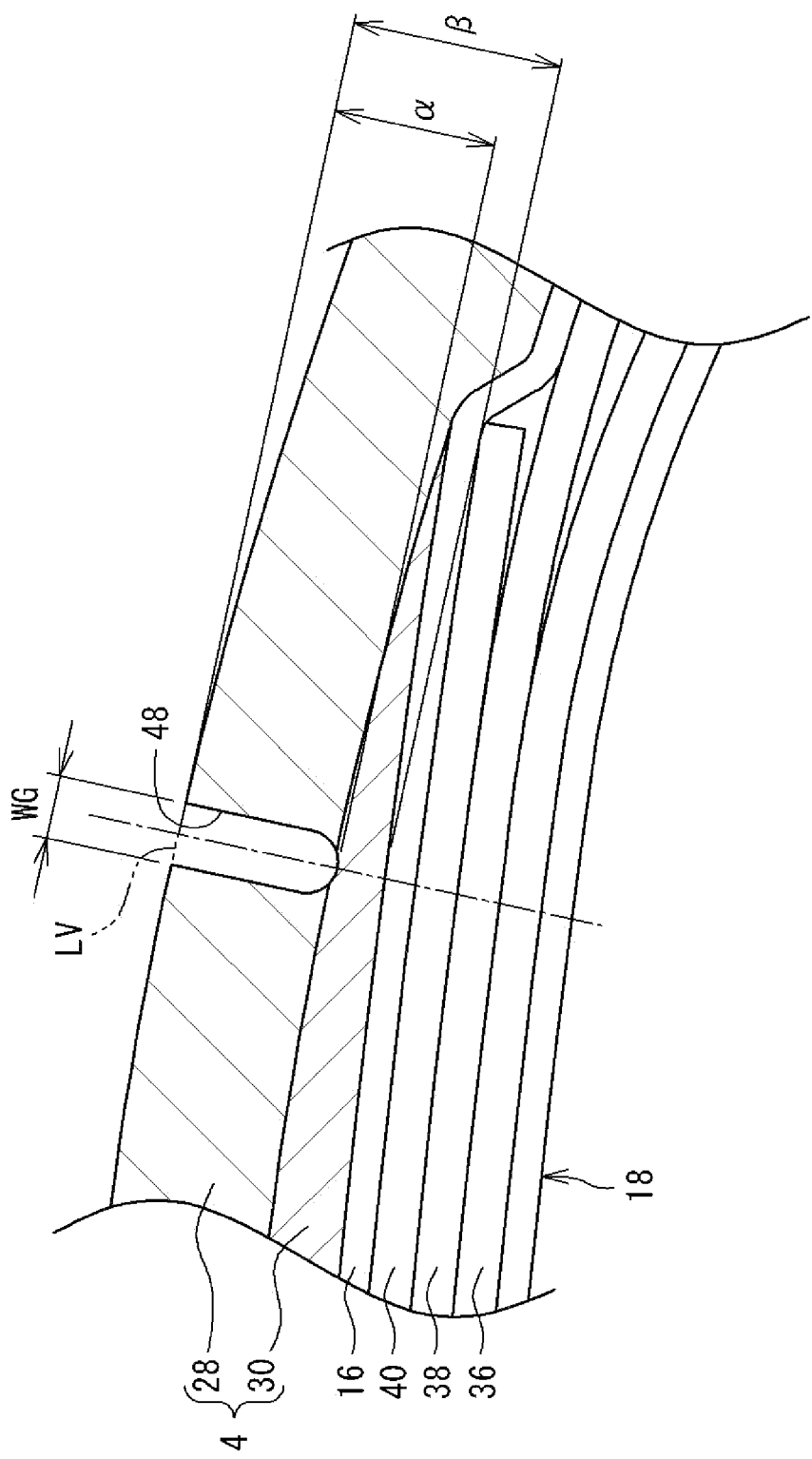
FIG. 3 is a cross-sectional view showing a circumferential narrow groove.

FIG. 3 shows a part of the shoulder land portion 46s shown in FIG. 2. FIG. 3 shows a portion where the circumferential narrow groove 48 is provided.

In FIG. 3, a length indicated by reference character WG is the groove width of the circumferential narrow groove 48. The groove width WG is represented as the opening width of the circumferential narrow groove 48 in the tread surface 24. The groove width WG is specified in the tire 2 in the normal state.

A length indicated by reference character α is the groove depth of the circumferential narrow groove 48. The groove depth α is the distance from the virtual tread surface LV to the groove bottom of the circumferential narrow groove 48.

A length indicated by reference character β is the thickness of the tread 4. The thickness β is represented as the distance, from the virtual tread surface LV to the inner surface of the tread 4, measured along a line segment indicating the groove depth α.

When the groove depth α of the circumferential narrow groove 48 and the thickness β of the tread 4 are measured in the above-described reference cut plane, a straight line connecting both edges of the circumferential narrow groove 48 is used as the virtual tread surface LV.

As described above, in the tire 2, the groove width WG of the circumferential narrow groove 48 is smaller than the groove width w of the shoulder circumferential groove 44s. As the groove width WG is smaller, the influence of the circumferential narrow groove 48 on the stiffness of the shoulder land portion 46s is reduced. However, if the groove width WG is less than 1% of with WT of the tread 4, the circumferential narrow groove 48 is similar to a sipe rather than a groove, so that groove walls thereof may be brought into close contact with each other due to application of a load, and the circumferential narrow groove 48 may be unable to function as a groove. In this case, there is a concern that generation of compressive strain is not sufficiently suppressed.

In the tire 2, the ratio (WG/WT) of the groove width WG of the circumferential narrow groove 48 to the width WT of the tread 4 is preferably not less than 1.0%. Accordingly, the circumferential narrow groove 48 can effectively contribute to suppressing generation of compressive strain. Since generation of compressive strain is suppressed, reduction of rolling resistance can be achieved in the tire 2. From this viewpoint, the ratio (WG/WT) is more preferably not less than 1.5%.

The ratio (WG/WT) is preferably not greater than 2.5%. Accordingly, the influence of the circumferential narrow groove 48 on the stiffness of the shoulder land portion 46s is suppressed. With the tire 2, good steering stability is maintained. From this viewpoint, the ratio (WG/WT) is more preferably not greater than 2.0%.

Even when the ratio (WG/WT) is not less than 1.0%, the groove width WG is not greater than 1.1 mm in some cases. In such a case, the circumferential narrow groove 48 is similar to a sipe, and may be unable to exhibit a function of suppressing generation of compressive strain. From the viewpoint of exhibiting a function of suppressing generation of compressive strain, the groove width WG of the circumferential narrow groove 48 is preferably larger than 1.1 mm. The groove width WG is more preferably not less than 1.2 mm, further preferably not less than 1.5 mm, and particularly preferably not less than 1.6 mm.

In the tire 2, the ratio ($\alpha/\beta$) of the groove depth a of the circumferential narrow groove 48 to the thickness $\beta$ of the tread 4 is preferably not less than 20% and not greater than 95%.

When the ratio ($\alpha/\beta$) is set so as to be not less than 20%, the circumferential narrow groove 48 can effectively contribute to suppressing generation of compressive strain. Since generation of compressive strain is suppressed, reduction of rolling resistance can be achieved in the tire 2. From this viewpoint, the ratio ($\alpha/\beta$) is more preferably not less than 50% and further preferably not less than 80%.

When the ratio ($\alpha/\beta$) is set so as to be not greater than 95%, the groove bottom of the circumferential narrow groove 48 is located at an appropriate distance from the band 16. In the tire 2, occurrence of an appearance defect caused by the groove bottom of the circumferential narrow groove 48 being located close to the band 16 is prevented. From this viewpoint, the ratio ($\alpha/\beta$) is more preferably not greater than 90%.

When the shoulder land portion 46s is pressed against a road surface, strain is generated at the groove bottom of the circumferential narrow groove 48. This strain may act as a factor that increases rolling resistance. In this case, a part of the rolling resistance reduction effect achieved by the function of suppressing generation of compressive strain by the circumferential narrow groove 48 is cancelled out by the strain generated at the groove bottom of the circumferential narrow groove 48.

In the tire 2, as shown in FIG. 3, the base portion 30 is located radially inward of the circumferential narrow groove 48. In the circumferential narrow groove 48 shown in FIG. 3, the groove bottom thereof is provided on the base portion 30. In other words, the base portion 30 forms the groove bottom of the circumferential narrow groove 48. As described above, the loss tangent LTb of the base portion 30 is lower than the loss tangent LTc of the cap portion 28.

In the tire 2, the base portion 30 which is located radially inward of the circumferential narrow groove 48 suppresses generation of heat caused by strain generated at the groove bottom of the circumferential narrow groove 48. The tire 2 can sufficiently exhibit a rolling resistance reduction effect achieved by the function of suppressing generation of compressive strain by the circumferential narrow groove 48.

The cap portion 28 may be disposed between the circumferential narrow groove 48 and the base portion 30. However, from the viewpoint of effectively suppressing generation of heat caused by strain generated at the groove bottom of the circumferential narrow groove 48, the groove bottom of the circumferential narrow groove 48 is more preferably formed by the base portion 30 as shown in FIG. 3.

Figure 4:
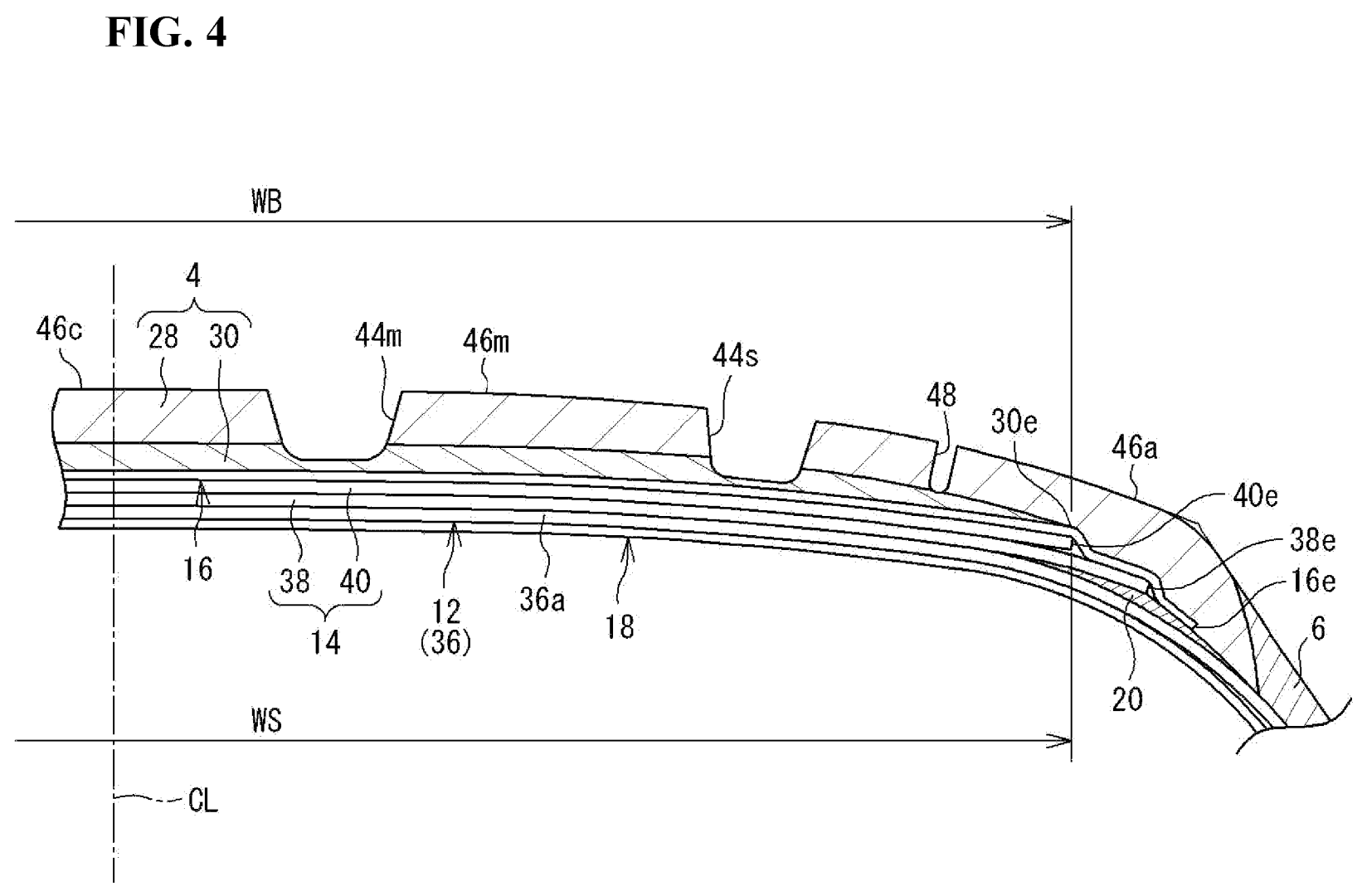

FIG. 4 shows a part of the tire 2 shown in FIG. 1. FIG. 4 shows a part of the tread portion. As shown in FIG. 4, the end 30e of the base portion 30 is located axially inward of the end 38e of the inner layer 38. The position of the end 30e of the base portion 30 substantially coincides with the position of the end 40e of the outer layer 40 in the axial direction.

In FIG. 4, a length indicated by reference character WB is the width in the axial direction of the base portion 30. The width WB in the axial direction is the distance in the axial direction from a first end 30e of the base portion 30 to a second end 30e of the base portion 30. A length indicated by reference character WS is the width in the axial direction of the outer layer 40. The width WS in the axial direction is the distance in the axial direction from a first end 40e of the outer layer 40 to a second end 40e of the outer layer 40.

In a tire during running, a portion at each shoulder land portion thereof actively moves. Therefore, various types of strain which is a factor that increases rolling resistance is generated in this portion. Strain generated in a portion at each end of a belt is also a factor that causes damage such as belt edge loose (BEL).

In order to ensure a volume of a base portion formed from a crosslinked rubber that has low heat generation properties and to reduce rolling resistance, in a conventional tire, a tread is formed such that each end of the base portion is located axially outward of an end of a band and the base portion covers the entireties of a belt and the band.

However, the strength of the crosslinked rubber that has low heat generation properties is low. Therefore, in the conventional tread having the above-described configuration, the existence of risk of occurrence of damage such as BEL is undeniable. Establishment of a technology capable of achieving reduction of the risk of damage is also required such that the tire can continue to stably exhibit a rolling resistance reduction effect.

In the tire 2, by forming the circumferential narrow groove 48 in the specific region of each shoulder land portion 46s, generation of compressive strain which is a factor that increases rolling resistance is suppressed. Therefore, even when the tread 4 is formed such that each end 30e of the base portion 30 is located axially inward of the end 38e of the inner layer 38, the rolling resistance of the tire 2 can be reduced. Since the entirety of the tread 4 that covers the portion at the end of the belt 14 can be formed with the cap portion 28, reduction of the risk of occurrence of damage such as BEL can be achieved. The tire 2 can continue to stably exhibit a rolling resistance reduction effect. The tire 2 can contribute to improvement of the fuel efficiency of a vehicle. Since the cap portion 28 can be formed from a crosslinked rubber for which importance is placed on WET performance, the tire 2 can also continue to exhibit good WET performance. From this viewpoint, in the tire 2, each end 30e of the base portion 30 is preferably located axially inward of the end 38e of the inner layer 38.

From the viewpoint of reducing the risk of occurrence of damage, preferably, the position of the end 30e of the base portion 30 substantially coincides with the position of the end 40e of the outer layer 40 in the axial direction. Specifically, the ratio (WB/WS) of the width WB in the axial direction of the base portion 30 to the width WS in the axial direction of the outer layer 40 is preferably not less than 95% and not greater than 105%.

When the ratio (WB/WS) is set so as to be not less than 95%, the volume of the base portion 30 in the tread 4 is increased. The tread 4 can contribute to reduction of rolling resistance. From this viewpoint, the ratio (WB/WS) is more preferably not less than 98%.

When the ratio (WB/WS) is set so as to be not greater than 105%, the base portion 30 is placed so as to be sufficiently spaced apart from the ends of the belt 14 and the band 16. The placement of the base portion 30 can contribute to reduction of the risk of occurrence of damage. From this viewpoint, the ratio (WB/WS) is more preferably not greater than 102%.

As described above, according to the present disclosure, the tire 2 that can achieve reduction of rolling resistance without decreasing WET performance is obtained. In particular, the present disclosure exhibits a remarkable effect in the tire 2 for a passenger car in which the ratio of the width in the axial direction of each shoulder land portion 46s to the width WT of the tread 4 is not less than 15% and not greater than 30%.

EXAMPLES

Hereinafter, the present disclosure will be described in further detail by means of examples, etc., but the present disclosure is not limited to these examples.

Example 1

A pneumatic tire for a passenger car (tire designation=205/55R16 91V) having the basic structure shown in FIG. 1 and having specifications shown in Table 1 below was obtained.

In Example 1, the ratio of the width in the axial direction of each shoulder land portion to the width WT of the tread was 17%.

Each of the groove widths w of the middle circumferential grooves and the shoulder circumferential grooves was 5 to 6% of the width WT of the tread.

The loss tangent LTb of the base portion was 0.10. The loss tangent LTc of the cap portion was 0.27.

The ratio (DX/DY) of the distance DX in the axial direction from the shoulder circumferential groove to the circumferential narrow groove to the distance DY in the axial direction from the shoulder circumferential groove to the outer layer was 50%.

The ratio (WG/WT) of the groove width WG of the circumferential narrow groove to the width WT of the tread was 2.0%.

The ratio of the groove depth α of the circumferential narrow groove to the thickness β of the tread was 90%. The groove bottom of the circumferential narrow groove was formed by the base portion. This is indicated as "Y" in the cell for "Groove bottom" in Table 1.

Each end of the base portion was located axially inward of the end of the inner layer. This is indicated as "in" in the cell for "End of base portion" in Table 1.

The ratio (WB/WS) of the width WB in the axial direction of the base portion to the width WS in the axial direction of the outer layer was 100%.

Comparative Example 1

A tire of Comparative Example 1 was obtained in the same manner as Example 1, except that no circumferential narrow groove was provided on each shoulder land portion.

Examples 2 and 3 and Comparative Examples 2 and 3

Tires of Examples 2 and 3 and Comparative Examples 2 and 3 were obtained in the same manner as Example 1, except that the ratio (DX/DY) was set as shown in Table 1 below.

Examples 4 to 6

Tires of Examples 4 to 6 were obtained in the same manner as Example 1, except that the ratio (WG/WT) was set as shown in Table 2 below.

Examples 7 to 9

Tires of Examples 7 to 9 were obtained in the same manner as Example 1, except that the ratio (α/β) was set as shown in Table 2 below. In Examples 7 and 8, the groove bottom of the circumferential narrow groove was formed by the cap portion. This is indicated as "N" in the cell for "Groove bottom" in Table 2.

Example 10

A tire of Example 10 was obtained in the same manner as Example 1, except that the cap portion and the base portion of the tread were formed with conventional specifications. Each end of the base portion was located axially outward of the end of the band. Accordingly, the entirety of the band was covered with the base portion. Therefore, each end of the base portion was located axially outward of the end of the inner layer. This is indicated as "out" in the cell for "End of base portion" in Table 2. The ratio (WB/WS) was 114%. The materials of the cap portion and the base portion are the same as those in Example 1.

[Rolling Resistance]

Using a rolling resistance testing machine, a rolling resistance coefficient (RRC) was measured when a test tire ran on a drum at a speed of 80 km/h under the following conditions. The results are shown as indexes in the cells for "RRC" in Tables 1 and 2 below with the result of Comparative Example 1 being regarded as 100. The higher the value is, the lower the rolling resistance of the tire is.

Rim: 16×6.5 J

Internal pressure: 210 kPa

Vertical load: 4.82 kN

[WET Performance]

Test tires were fitted onto rims (size=16×6.5 J) and inflated with air to adjust the internal pressures of the tires to 250 kPa. The tires were mounted to a test vehicle (passenger car). The test vehicle was driven on a test course with a wet road surface (water film thickness=1.4 mm), and lap times were measured. The results are shown as indexes in the cells for "WET" in Tables 1 and 2 below with the result of Comparative Example 1 being regarded as 100. The higher the value is, the better the WET performance is.

[Durability]

A test tire was fitted onto a rim (size=16×6.5 J) and inflated with air to adjust the internal pressure thereof to 250 kPa. The tire was mounted to a drum type tire testing machine. A vertical load of 7.33 kN was applied to the tire, and the tire was caused to run on a drum (radius=1.7 m) at a speed of 100 km/h. The running distance was measured until damage (BEL) to the tire was observed. The results are shown as indexes in the cells for "BEL" in Tables 1 and 2 below with the result of Comparative Example 1 being regarded as 100. The higher the value is, the less likely damage occurs and the better the durability is. In this evaluation, if the index is 95 or higher, it is acceptable as it is determined that occurrence of damage is suppressed.

[Steering Stability]

A test tire was fitted onto a rim (size=16×6.5 J) and inflated with air to adjust the internal pressure thereof to 250 kPa. The tire was mounted to a flat belt type tire testing machine. A camber angle was set to 0 degrees. A vertical load of 4.3 kN was applied to the tire, a slip angle was set to 1.0 degree, the tire was caused to run at a speed of 10 km/h, and the cornering power was measured. The results are shown as indexes in the cells for "CP" in Tables 1 and 2 below with the result of Comparative Example 1 being regarded as 100. The higher the value is, the larger the cornering power is and the better the steering stability is.

15

TABLE 1

|  | Comp. Ex. 1 | Comp. Ex. 2 | Ex. 2 | Ex. 1 | Ex. 3 | Comp. Ex. 3 |
|---|---|---|---|---|---|---|
| DX/DY [%] | — | 10 | 15 | 50 | 55 | 90 |
| WG/WT [%] | — | 2.0 | 2.0 | 2.0 | 2.0 | 2.0 |
| α/β [%] | — | 90 | 90 | 90 | 90 | 90 |
| Groove bottom | — | Y | Y | Y | Y | Y |
| End of base portion | in | in | in | in | in | in |
| WB/WS [%] | 100 | 100 | 100 | 100 | 100 | 100 |
| RRC | 100 | 100 | 103 | 105 | 106 | 103 |
| WET | 100 | 100 | 100 | 100 | 100 | 100 |
| BEL | 100 | 100 | 100 | 100 | 96 | 90 |
| CP | 100 | 97 | 97 | 97 | 97 | 97 |

TABLE 2

|  | Ex. 4 | Ex. 5 | Ex. 6 | Ex. 7 | Ex. 8 | Ex. 9 | Ex. 10 |
|---|---|---|---|---|---|---|---|
| DX/DY [%] | 50 | 50 | 50 | 50 | 50 | 50 | 50 |
| WG/WT [%] | 0.9 | 1.0 | 2.5 | 2.0 | 2.0 | 2.0 | 2.0 |
| α/β [%] | 90 | 90 | 90 | 20 | 50 | 80 | 90 |
| Groove bottom | Y | Y | Y | N | N | Y | Y |
| End of base portion | in | in | in | in | in | in | out |
| WB/WS [%] | 100 | 100 | 100 | 100 | 100 | 100 | 114 |
| RRC | 101 | 103 | 105 | 101 | 103 | 104 | 107 |
| WET | 100 | 100 | 100 | 100 | 100 | 100 | 100 |
| BEL | 100 | 100 | 100 | 100 | 100 | 100 | 95 |
| CP | 100 | 98 | 95 | 99 | 98 | 97 | 97 |

As shown in Tables 1 and 2, it is confirmed that, in each Example, reduction of rolling resistance is achieved without decreasing WET performance and a rolling resistance reduction effect is continuously exhibited. From the evaluation results, advantages of the present disclosure are clear.

The above-described technology capable of achieving reduction of rolling resistance without decreasing WET performance can also be applied to various tires.

Preferably, in the tire, a ratio of the groove width of the circumferential narrow groove to a width of the tread is not less than 1.0% and not greater than 2.5%.

Preferably, in the tire, a ratio of a groove depth of the circumferential narrow groove to a thickness of the tread is not less than 20% and not greater than 95%.

Preferably, in the tire, the tread includes a cap portion configured to come into contact with the road surface and a base portion located radially inward of the cap portion. A loss tangent of the base portion at 30° C. is lower than a loss tangent of the cap portion at 30° C. The base portion is located radially inward of the circumferential narrow groove.

Preferably, in the tire, a groove bottom of the circumferential narrow groove is formed by the base portion.

Preferably, in the tire, each end of the base portion is located axially inward of the end of the inner layer.

Preferably, in the tire, a ratio of a width in the axial direction of the base portion to a width in the axial direction of the outer layer is not less than 95% and not greater than 105%.

According to the present disclosure, a tire that can achieve reduction of rolling resistance without decreasing WET performance is obtained.

What is claimed is:

1. A tire comprising:
a tread configured to come into contact with a road surface; and
a belt radially inward of the tread, wherein

16 four circumferential grooves are formed on the tread and aligned in an axial direction such that five land portions are formed in the tread, among the four plurality of circumferential grooves, a circumferential groove on each outermost side in the axial direction is a shoulder circumferential groove, among the five land portions, a land portion on each outermost side in the axial direction is a shoulder land portion, a land portion located at a center in the axial direction is a center land portion, and a land portion located axially between the center land portion and the shoulder land portion is a middle land portion;

no circumferential groove is formed on the middle land portion;

the belt includes an inner layer and an outer layer radially outward of the inner layer, each end of the outer layer is axially inward of an end of the inner layer, a circumferential narrow groove is formed on the shoulder land portion so as to continuously extend in a circumferential direction, a groove width of the circumferential narrow groove is smaller than a groove width of the shoulder circumferential groove, the circumferential narrow groove is between the shoulder circumferential groove and the end of the outer layer in the axial direction, a ratio of a distance in the axial direction from the shoulder circumferential groove to the circumferential narrow groove to a distance in the axial direction from the shoulder circumferential groove to the end of the outer layer is from 15% to 55%, and a ratio of a groove depth of the circumferential narrow groove to a thickness of the tread is from 80% to 90%.

2. The tire according to claim 1, wherein
a ratio of the groove width of the circumferential narrow groove to a width of the tread is from 1.5% to 2.5%.

3. The tire according to claim 1, wherein
the tread includes a cap portion configured to come into contact with the road surface and a base portion radially inward of the cap portion,
a loss tangent of the base portion at 30° C. is lower than a loss tangent of the cap portion at 30° C., and
the base portion is radially inward of the circumferential narrow groove.

4. The tire according to claim 3, wherein a groove bottom of the circumferential narrow groove is formed by the base portion.

5. The tire according to claim 3, wherein each end of the base portion is axially inward of the end of the inner layer.

6. The tire according to claim 3, wherein a ratio of a width in the axial direction of the base portion to a width in the axial direction of the outer layer is from 95% to 105%.

7. The tire according to claim 1, wherein
a ratio of a width in the axial direction of the shoulder land portion to a width of the tread is from 15% to 30%.

8. The tire according to claim 7, wherein
the tread includes a cap portion configured to come into contact with the road surface and a base portion radially inward of the cap portion, and
a ratio of a loss tangent of a base portion of the tread to a loss tangent of a cap portion of the tread is from 0.15 to 0.55.

9. The tire according to claim 1, wherein
the tread includes a cap portion configured to come into contact with the road surface and a base portion radially inward of the cap portion, and a ratio of a loss tangent of a base portion of the tread to a loss tangent of a cap portion of the tread is from 0.15 to 0.55.

10. A tire comprising:

a tread configured to come into contact with a road surface; and a belt radially inward of the tread, wherein four circumferential grooves are formed on the tread and aligned in an axial direction such that five land portions are formed in the tread, a ratio of the groove width of each of the circumferential grooves to a width of the tread is from 3% to 15%, among the four circumferential grooves, a circumferential groove on each outermost side in the axial direction is a shoulder circumferential groove, among the five land portions, a land portion on each outermost side in the axial direction is a shoulder land portion, a land portion located at a center in the axial direction is a center land portion, and a land portion located axially between the center land portion and the shoulder land portion is a middle land portion, no circumferential groove is formed on the middle land portion, the belt includes an inner layer and an outer layer radially outward of the inner layer, each end of the outer layer is axially inward of an end of the inner layer, a circumferential narrow groove is formed on the shoulder land portion so as to continuously extend in a circumferential direction, a groove width of the circumferential narrow groove is smaller than a groove width of the shoulder circumferential groove, the circumferential narrow groove is between the shoulder circumferential groove and the end of the outer layer in the axial direction, a ratio of a distance in the axial direction from the shoulder circumferential groove to the circumferential narrow groove to a distance in the axial direction from the shoulder circumferential groove to the end of the outer layer is from 15% to 55%, a ratio of the groove width of the circumferential narrow groove to a width of the tread is from 1.5% to 2.5% the tread includes a cap portion configured to come into contact with the road surface and a base portion radially inward of the cap portion, a loss tangent of the base portion at 30° C. is lower than a loss tangent of the cap portion at 30° C., the base portion is radially inward of the circumferential narrow groove, a groove bottom of the circumferential narrow groove is formed by the base portion, and a ratio of a groove depth of the circumferential narrow groove to a thickness of the tread is from 80% to 90%.

11. The tire according to claim 10, wherein each end of the base portion is axially inward of the end of the inner layer.

12. The tire according to claim 11, wherein a ratio of a width in the axial direction of the base portion to a width in the axial direction of the outer layer is from 95% to 105%.

13. The tire according to claim 10, wherein a ratio of a width in the axial direction of the base portion to a width in the axial direction of the outer layer is from 95% to 105%.

14. The tire according to claim 10, wherein a ratio of a width in the axial direction of the shoulder land portion to a width of the tread is from 15% to 30%.

15. The tire according to claim 14, wherein a ratio of the loss tangent of the base portion of the tread to the loss tangent of the cap portion of the tread is from 0.15 to 0.55.

16. The tire according to claim 10, wherein a ratio of the loss tangent of the base portion of the tread to the loss tangent of the cap portion of the tread is from 0.15 to 0.55.

* * * * *